United States Patent [19]
Bain et al.

[11] 3,888,964
[45] June 10, 1975

[54] THERMALLY REVERSIBLE POLYMER COMPOSITIONS PREPARED FROM POLYISOTHIOCYANATES

[75] Inventors: Peter James Stratford Bain, Lower Hutt, New Zealand; Ernest Bryson McCall, Bierges, Belgium

[73] Assignee: Monsanto Chemicals Limited London, England

[22] Filed: Apr. 18, 1974

[21] Appl. No.: 461,905

[30] Foreign Application Priority Data
Apr. 25, 1973   United Kingdom............... 19563/73

[52] U.S. Cl. . 264/236; 260/77.5 CR; 260/77.5 CH; 260/77.5 AT; 260/79; 260/79.5 C; 260/79.5 NV; 264/329; 264/331
[51] Int. Cl. ............................................. B29c 25/00
[58] Field of Search....... 260/79, 77.5 CR, 77.5 AT, 260/77.5 CH, 79.5 C, 79.5 NV; 264/236, 329, 331

[56] References Cited
UNITED STATES PATENTS
3,645,981   2/1972   Bonner, Jr.................. 260/77.5 CH
3,666,728   5/1972   Bonner, Jr........................... 260/79

*Primary Examiner*—Melvyn I. Marquis

[57] ABSTRACT

Thermally-reversible polymer compositions, and method of preparing said compositions, comprising amine-modified polymer cross-linked with thiourea units of the formula

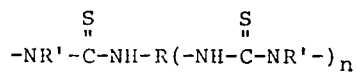

in which R is an organic radical in which a non-aromatic carbon atom is linked to the adjacent nitrogen atoms, R' is hydrogen, aliphatic or cycloaliphatic group and $n$ is an integer of 1 or more, are described.

16 Claims, No Drawings

THERMALLY REVERSIBLE POLYMER COMPOSITIONS PREPARED FROM POLYISOTHIOCYANATES

CROSS-REFERENCE TO RELATED APPLICATIONS

This application relates to British Application No. 19,563/73 filed Apr. 25, 1973. This invention relates to polymeric compositions more particularly to polymeric compositions wherein certain molecular linkages in the polymer show thermal lability.

BACKGROUND OF THE INVENTION

Polymeric materials can be broadly classified as either thermoplastic or thermosetting according to their behavior on heating. Thermoplastic resins are those which can be softened or melted by heat and while soft or molten can be molded, cast or extruded under pressure. On cooling below their softening point, they become rigid and retain the shape of the mold. Thermoplastic castings or moldings, upon being reheated, again become soft and fusible and can be remolded.

Thermosetting resins include prepolymers and other precursors which can be softened by heating and while soft can be molded or cast under heat and pressure. They change chemically, however, during heating, to become hard, infusible substances, so that once the resin has set or cured it cannot be softened by heating, or remolded. The difference in behavior between thermoplastic and thermosetting resins is associated with a difference in molecular structure, the former having essentially linear molecules with little or no intermolecular interaction, while the latter have a three-dimensional structure with inter-chain cross-links.

It will be seen that the manufacture of articles from thermosetting resins has certain unfavorable features compared with the use of thermoplastic resins; in particular there is a limit to the time during which the resin can be held at an elevated temperature before molding, and there can be no reworking of scrap moldings. On the other hand, thermoset resins have in many instances desirable physical properties which cannot be matched by those of thermoplastic resins.

The conventional vulcanization of hydrocarbon rubbers, for example natural rubber or styrene-butadiene rubber, in which the rubber is heated with sulfur, is, on a broad view, an irreversible reaction analogous to the curing of a thermosetting resin. The limitation on the duration of holding the mixture at an elevated temperature before molding is encountered in the phenomenon of scorch or prevulcanization, so that close control of mixing times and temperatures and of the forming processes prior to vulcanization is essential if high scrap rates are to be avoided. Forming operations such as injection molding can, under appropriate conditions, be used in the production of vulcanized rubber articles. Unlike the injection molding of thermoplastics, however, where a cooled mold can be used and the casting removed very shortly after injection, the vulcanization requires the use of a heated mold and residence in the mold until vulcanization is complete.

Other methods of vulcanizing elastomers, for example the use as vulcanizing agents of sulfur-donating compounds or organic peroxides in the vulcanization of hydrocarbon rubbers, or the use of metal oxides in the vulcanization of polychloroprene, involve irreversible cross-link formation, and the processing limitations consequent thereon.

Polymeric compositions having thermally reversible cross-links, so that the compositions would exhibit properties characteristic of thermoset resins or vulcanized rubbers at service temperatures, but thermoplastic properties at higher, processing temperatures, with restoration of the service temperature properties on cooling, would therefore represent a valuable advance in plastic and rubber technology. Such compositions and a process for their production are provided by the present invention.

SUMMARY OF THE INVENTION

A thermally reversible vulcanizate of the present invention has a molecular structure wherein polymer chains are linked directly or via groups pendant from the polymer chains, by units having the formula

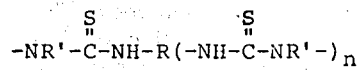

where R is an organic radical such that the adjacent nitrogen atoms are each linked to a non-aromatic carbon atom of R, R' is a hydrogen atom or an aliphatic or cycloaliphatic group, n is an integer having a value of at least 1, each of the terminal nitrogen atoms of the unit (i.e. the nitrogen atoms to which the hydrogen atoms or groups R' are attached) being linked to a non-aromatic carbon atom of the polymer chain or of a group pendant from the polymer chain. The usual range of values of n is from 1 to 3, and a composition of the invention can contain units having different values of n. The linking units may be present as cross-links between chains or as chainextending units.

The invention includes a process for the production of a vulcanizate as defined above, which comprises incorporating a polyisothiocyanate of the formula $R(NCS)_{n+1}$ (where R is an organic radical such that the nitrogen atom of each isothiocyanate group is linked to a non-aromatic carbon atom of R, and $n+1$ is the valency of R) into a polymer (hereinafter referred to as an amine-modified polymer) having amino groups of the formula —NHR' (where R' is as defined above) linked to non-aromatic carbon atoms of polymer chains or to non-aromatic carbon atoms of groups pendant from the polymer chains, whereby cross-link formation or chain extension occurs by reaction of the polyisothiocyanate with the amino groups of the polymer.

The process is conducted in the absence of conditions which would produce permanent cross-links or chain extension in the polymer.

A further aspect of the invention is a method of producing an article from a vulcanizate of the invention, which comprises heating the vulcanizate to a temperature at which it forms a composition which exhibits smooth flow under pressure, filling a mold with the heated composition, allowing the thus-molded article to cool to a temperature at which it retains its form on removal from the mold, and removing the cooled article from the mold.

This method can be applied, for example, to the injection molding of rubber articles, and enables articles having the physical properties of rubber vulcanizates to be produced much more rapidly than by a conventional vulcanization process. The method includes the situation where the vulcanizate that is heated has already been heated and cooled once or several times previously, as in the recovery of scrap moldings.

The polyisothiocyanate can be incorporated into the aminemodified polymer by any conventional method of mixing, for example on a mill or in an internal mixer, at any temperature at which the polymer is in an adequately plastic condition. Mixing is continued until the polyisothiocyanate is uniformly distributed throughout the polymer.

The vulcanizates of the invention have physical properties characteristic of such compositions, e.g. of thermoset resins or of vulcanized rubbers at temperatures encountered under most service conditions, i.e. at temperatures in the range 0° to 100°C or even up to 150°C. At higher temperatures, however, for example above 160°C, the behavior of the compositions is consistent with scission of the cross-links or chain-extending links, but these, and the associated physical properties, are restored when the composition cools. Thus, the temperature at which the polyisothiocyanate is incorporated into the polymer may be such that cross-links or chain-extending links are not formed during mixing, but during cooling after mixing.

In preferred instances, the amine-modified polymer has a relatively low molecular weight and is a liquid at ordinary room temperatures, for example at 20°C. Using a reactive polyisothiocyanate such as an alkylene diisothiocyanate, thiourea cross-link formation or chain extension will occur simply on mixing a liquid polymer with the diisothiocyanate at room temperature.

The radical R of the polyisocyanate that is used in the process of the invention can be for example an aliphatic or cycloaliphatic radical, preferably saturated, but possibly containing ethylenic unsaturation, or a radical containing both aliphatic and cycloaliphatic structures. Alternatively, the radical may contain a combination of aromatic and aliphatic or cycloaliphatic structures, provided that the nitrogen atom of each isothiocyanate group is linked to a non-aromatic carbon atom.

The polyisothiocyanates where R in the above formula is an alkylene radical having from 2 to 20 carbon atoms, more especially the diisothiocyanates where R is an alkylene radical of from 4 to 10 carbon atoms, are a preferred class of polyisothiocryanates for use in the present invention. The alkylene chain may be straight or branched. Typical examples are tetramethylene diisothiocyanate, pentamethylene diisothiocyanate, hexamethylene diisothiocyanate, decamethylene diisothiocyanate and 2,5-dimethylhexamethylene diisothiocyanate.

Related compounds are diisothiocyanates where the alkylene chain is interrupted by one or more heteroatoms, for example oxygen atoms, as for example in 3-oxapentane-1,5-diisothiocyanate.

In polyisothiocyanates where the radical R is wholly or partly cycloaliphatic, the cycloaliphatic structure is usually a cycloalkylene or alkylcycloalkylene radical having from 5 to 7 ring carbon atoms and a total of from 5 to 15 carbon atoms, although larger rings are possible. Cyclohexane-1,4-diisothiocyanate is an example of an cycloaliphatic diisothiocyanate and the menthane diisothiocyanates of the formula

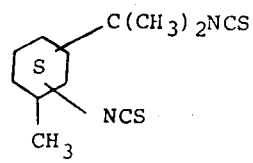

for example p-menthane 1,8-diisothiocyanate, are examples of polyisocyanates where R is a combination of an alkylcycloalkylene and an alkylene radical.

In xylylene diisothiocyanate the radical R contains both aliphatic and aromatic units but the isothiocyanate groups are linked to aliphatic carbon atoms.

The amine-modified polymer can be prepared by polymerization or interpolymerization of an appropriate nitrogen atom-containing monomer, or by modification of a preformed polymer.

An aliphatic group R' can be, for example, an alkyl or alkenyl group, especially one containing up to 8 carbon atoms. R' is preferably hydrogen or a straight chain group of up to 4 carbon atoms, for example a methyl-,ethyl, n-propyl or allyl group. Cyclopentyl, cyclohexyl and methylcyclohexyl are examples of cycloaliphatic groups from which R' may be selected.

The groups —NHR' may each be directly linked to a non-aromatic carbon atom of the polymer chain or more usually to a non-aromatic carbon atom of a bridge of one or more other atoms linking the group —NHR' to the polymer chain. Preferably such a bridge contains not more than 6 atoms, and it can be, for example, an alkylene bridge, as for instance where the pendant groups are 2-aminoethyl groups. Examples of other pendant groups are 2(N-methylamino)ethyl, 4-amino-n-butyl, 4(N-ethylamino)-N-butyl, 4(N-cyclohexylamino)-n-butyl and 2-aminoethylthio groups.

Amine-modified polymers for use in the present invention may contain, for example, from $10^{-4}$ to $10^{-2}$ gram-equivalents of the group —NHR' per gram of polymer, the preferred range being from $2 \times 10^{-4}$ to $2 \times 10^{-3}$ gram equivalents per gram of polymer.

In a particular embodiment of the invention, the polymer is an amine-modified diene polymer or copolymer, for example a polymer of 1,3-butadiene or isoprene, or an interpolymer of the diene and at least one other ethylenically unsaturated monomer. In such interpolymers, the additional monomer is preferably styrene or a substituted styrene, but it can, for instance, be an olefin, for example isobutylene. In preferred interpolymers the diene is the major component, and typically may represent from 50 to 95 percent, for example from 55 to 85 percent, by weight of the interpolymer.

An amine-modified diene polymer or copolymer is conveniently prepared by polymerizing the diene, and any copolymerizable monomer, using an azobis(alkane carbonitrile) as an initiator for the polymerization, (which results in the introduction of nitrile groups mainly in end positions in the polymer chain,) followed by reduction of the nitrile groups to amino groups. Reaction of the polyisothiocyanate with this type of polymer probably results in both cross-link formation and chain extension.

Other polymers to which the process of the invention can be applied include mono-olefin polymers and copolymers, for instance copolymers of ethylene, propylene or isobutene, with vinyl aromatic compounds, for instance styrene and substituted styrenes, with vinyl chloride, or with mixtures of such monomers with each other or with other polymerizable monomers.

Reaction of a polyisothiocyanate with a polymer having a single —NHR' group at one end only of the polymer chain results essentially in chain extension without cross-link formation.

The compositions of the invention can contain additives customarily included in conventional polymer compositions and substantially inert with respect to the cross-linking or chain-extending process, for example fillers such as carbon black and silica, antidegradants (i.e. antioxidants or antiozonants), and processing aids. Oil-extended synthetic elastomers can be used.

Conditions which would produce permanent cross-linking or chain extension in the polymer, and which must be avoided in the production of the compositions of the invention, include exposing the compositions to radiation of a type capable of generating free radicals at points on the polymer chain, and the presence in the polymer of various substances known to be effective as chemical cross-linking or chain extension agents. These include organic peroxides, quinones, their precursors such as certain methylol bisphenols and analogous substances such as dioximes, sulfur, and sulfur-containing vulcanizing agents such as thiuram di- and polysulfides and amine di- and polysulfides.

DESCRIPTION OF PREFERRED EMBODIMENTS

The invention is illustrated by the following Examples.

EXAMPLE 1 a. Preparation of a polybutadiene containing pendant primary amino groups

A mixture of 2,2'-azobis-(2-pentane carbonitrile) (5.04g), 2,2'-azobis-(2,4-pentane dicarbonitrile) (6.76g), butadiene (216g) and dioxane (280ml) is heated in sealed bottles during 72 hours at 60°C. After venting excess of butadiene, the solution is added to a suspension of lithium aluminium hydride (5.0g) in anhydrous ether (2.5 l) during 2 hours. After 24 hours, excess lithium aluminium hydride is destroyed with ethyl acetate and the gelatinous reaction mixture is cautiously treated with 5N. NaOH (40ml). After filtration and evaporation there is obtained a viscous, pale yellow, liquid polymer (89.3g) containing $7.0 \times 10^{-4}$ equivalents of $NH_2$/g of polymer.

The amine groups in the polymer are determined by reacting a measured amount of the polymer with a measured quantity of nonyl isothiocyanate (in excess of the stoichiometric quantity) in carbon tetrachloride solution, and determining the excess of isothiocyanate spectroscopically from its strong absorbance at 2,090 $cm^{-1}$.

b. Preparation of thermally-labile vulcanizate

The polymer (50.0g) is mixed with hexamethylene bisisothiocyanate (3.5g, equivalent to all of the $NH_2$ groups present) and, after four minutes stirring, the mixture solidifies.

The solid is cut into small pieces and molded, using a transfer mold at 190°C, to a sheet approximately 15 cm square and 2mm thick, which is pale yellow and which has the mechanical properties given in Table 1. The remainder of the sheet and test pieces are cut up, mixed with some fresh polymer (10g) and again molded at 190°C to give a vulcanizate little different from that initially obtained.

TABLE 1

|  | (1) First molding | (1) Second molding |
| --- | --- | --- |
| Tensile strength (kg/cm²) | 12.8 | 13.1 |
| Elongation at break (%) | 360 | 310 |
| 100% modulus (kg/cm²) | 4.1 | 5.0 |
| 200% modulus (kg/cm²) | 6.3 | 8.0 |
| 300% modulus (kg/cm²) | 9.6 | 12.6 |

(1) Mechanical properties are determined using E type dumpbells.

EXAMPLE 2

A polymer is prepared using the same technique as in Example 1 but from 4,4-azobis-(1,4-pentane dicarbonitrile) (3.38g), butadiene (54g) and dioxane (70 ml). The resulting polymer is a pale yellow viscous oil with an amine content of $1.08 \times 10^{-3}$ equivalents/g of polymer, and believed to have

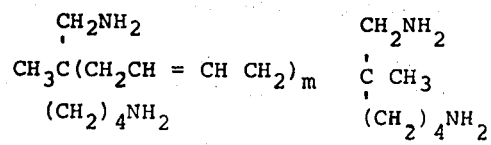

where $m$ is the degree of polymerization, as the predominant molecular species.

The polymer (5.0g) is mixed with hexamethylene bisisothiocyanate (0.54g, equivalent to 100 percent of the $NH_2$ groups in the polymer) and the mixture rapidly solidifies. The solid is cut into small pieces and compression molded at 180°C to give a disc of rubber 1 inch in diameter and 0.3 inch thick for which the force required to obtain 25 percent compression is 73 kg/cm² and no permanent set is found after the test.

EXAMPLE 3

The liquid polymer of Example 2 (5.0g) is mixed with p-menthane-1,8-diisothiocyanate (0.685g, equivalent to all of the $NH_2$ groups) to give a liquid which sets slowly at 23°C, but rapidly on a steam bath. The resulting polymer is cut up and molded at 180°C to give a disc. The force required for 25 percent compression is 71 kg/cm² and no permanent set is found.

EXAMPLE 4

50 Grams of a liquid amine-modified polybutadiene prepared by the method of Example 1 and containing $5 \times 10^{-4}$ equivalents of $NH_2$ per gram, is mixed with hexamethylene bisisothiocyanate (2.50g), and the resulting vulcanizate is transfer-molded at 190°C to give a sheet of rubber with the mechanical properties given in the table below. The same polymer (30.0g) and Vulcan 3, an HAF black, (20.0g) is mixed using a mortar and pestle, and then hexamethylene bisisothiocyanate (1.50g) is mixed into the paste. The resulting hard vulcanizate is transfer-molded at 190°C to give a sheet of rubber with the properties given in the table below.

|  | unfilled | black filled |
| --- | --- | --- |
| Tensile strength (kg/cm²) | 9 | 59 |
| Elongation at break (%) | 400 | 80 |

EXAMPLE 5

An amine-modified polybutadiene prepared by the method of Example 1 and containing $8.4 \times 10^{-4}$ equivalents of $NH_2/g$, is cross-linked with three different concentrations of hexamethylene bisisothiocyanate, and sheets molded using a transfer mold at 190°C. The tensile strength and 100 percent modulus rises with increasing cross-link density while the elongation at break falls. The results are shown in the table below:

| | | | |
|---|---|---|---|
| Cross-link density moles/g $\times 10^4$ | 2.1 | 3.0 | 4.2 |
| Tensile strength (kg/cm²) | 9 | 15 | 21 |
| Elongation at break (%) | 220 | 200 | 150 |
| 100% Modulus (kg/cm²) | 5 | 10 | 17 |
| 200% Modulus (kg/cm²) | 8 | 15 | — |

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A thermally reversible vulcanizate having a molecular structure wherein polymer chains of a diene polymer or copolymer are linked, directly or via groups pendant from the polymer chains, by units having the formula

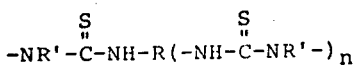

where R is an organic radical such that the adjacent nitrogen atoms are each linked to a non-aromatic carbon atom of R, R' is a hydrogen atom or an aliphatic or cycloaliphatic group, n is an integer having a value of at least 1, each of the terminal nitrogen atoms of the unit being linked to a non-aromatic carbon atom of the polymer chain or of a group pendant from the polymer chain.

2. The vulcanizate of claim 1, in which the radical R is (i) straight or branched chain alkylene radical of from 2 to 20 carbon atoms (ii) a cycloalkylene or alkylcycloalkylene radical having 5, 6 or 7 ring carbon atoms and a total of from 5 to 15 carbon atoms, or (iii) a combination of radicals of types (i) and (ii); R' is a hydrogen atom or an alkyl or alkenyl group of up to 8 carbon atoms; n has the value 1, 2 or 3; and the terminal nitrogen atoms of the linking unit are each linked to a carbon atom of a diene polymer or copolymer chain or to a carbon atom of a $C_{1-6}$ alkylene group pendant from a diene polymer or copolymer chain.

3. The vulcanizate of claim 2, in which R is an alkylene radical of from 4 to 10 carbon atoms or a menthylene radical of the formula

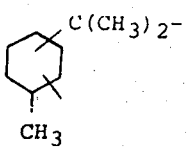

R' is a hydrogen atom or a straight chain alkyl or alkenyl group of up to 4 carbon atoms; n has the value 1; the diene polymer is a poly(1,3-butadiene), a polyisoprene or a copolymer of 1,3-butadiene and styrene containing 55 to 85 percent by weight of 1,3-butadiene units; and the terminal nitrogen atoms of the linking unit are linked to $C_{1-6}$ alkylene groups pendant from the polymer chains.

4. The vulcanizate of claim 3 in which R is hexamethylene, and R' is hydrogen.

5. A process for the production of a thermally reversible vulcanizate, which comprises incorporating, a polyisothiocyanate of the formula $R(NCS)_{n+1}$ where R is an organic radical such that the nitrogen atom of each isothiocyanate group is linked to a non-aromatic carbon atom of R and n+1 is the valency of R, into a diene polymer or copolymer having amino groups of the formula —NHR' where R' is a hydrogen atom or an aliphatic or cycloaliphatic group linked to non-aromatic carbon atoms of polymer chains or to non-aromatic carbon atoms of groups pendant from the polymer chains, effecting cross-link formation or chain extension by reaction of the polyisocyanate with the amino groups of the polymer, while avoiding conditions giving permanent cross- or chain-extending links in the polymer.

6. The process of claim 5, in which R in the formula of the polyisothiocyanate is (i) straight or branched chain alkylene radical of from 2 to 20 carbon atoms, (ii) a cycloalkylene or alkylcycloalkylene radical having 5, 6 or 7 ring carbon atoms and a total of from 5 to 15 carbon atoms, or (iii) a combination of radicals of types (i) and (ii), and n has the value 1, 2 or 3.

7. The process of claim 6, in which R in the formula of the polyisothiocyanate is an alkylene radical of from 4 to 10 carbon atoms and n has the value 1.

8. The process according to claim 6, in which the polyisothiocyanate is a menthane diisothiocyanate of the formula

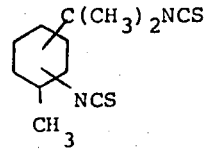

9. The process of claim 6, in which the polymer is an amine-modified poly(1,3-butadiene) or polyisoprene, or an amine-modified styrene/1,3-butadiene copolymer containing from 55 to 85 percent by weight of 1,3-butadiene units.

10. The process of claim 9, in which the polymer is one where each amine group of the formula —NHR' is linked to the polymer chain via an alkylene bridge of from 1 to 6 carbon atoms.

11. The process of claim 6 in which R' is an alkyl or alkenyl group of up to 8 carbon atoms.

12. The process of claim 6 in which the amine-modified diene polymer or copolymer is obtained by polymerizing a diene or a diene and copolymerizable monomer using an azobis (alkane carbonitrile) as initiator to give a polymer or copolymer containing nitrile groups, and reducing the nitrile groups to amino groups.

13. The process of claim 12 in which the amine-modified polymer contains from $10^{-4}$ to $10^{-2}$ gram-equivalents of the group —NHR' per gram of polymer.

14. The process of claim 13 in which the amine-modified polymer is a liquid at 20°C.

15. The process of claim 9 in which R is hexamethylene, n is one and R' is hydrogen.

16. A method of producing an article from a thermally reversible vulcanizate having a molecular structure wherein polymer chains of a diene polymer or copolymer are linked, directly or via groups pendant from the polymer chains, by units having the formula

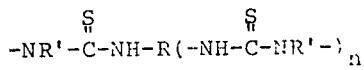

where R is an organic radical such that the adjacent nitrogen atoms are each linked to a non-aromatic carbon atom of R, R' is a hydrogen atom or an aliphatic or cycloaliphatic group, n is an integer having a value of at least 1, each of the terminal nitrogen atoms of the unit being linked to a non-aromatic carbon atom of the polymer chain or of a group pendant from the polymer chain, which comprises heating the vulcanizate to a temperature at which it forms a composition which exhibits smooth flow under pressure, filling a mold with the composition, allowing the molded article to cool to a temperature at which it retains its form on removal from the mold, and removing the article from the mold.

* * * * *